Nov. 5, 1935. C. M. TUTTLE 2,019,748
PHOTOGRAPHIC PRINTING APPARATUS
Filed Sept. 18, 1934
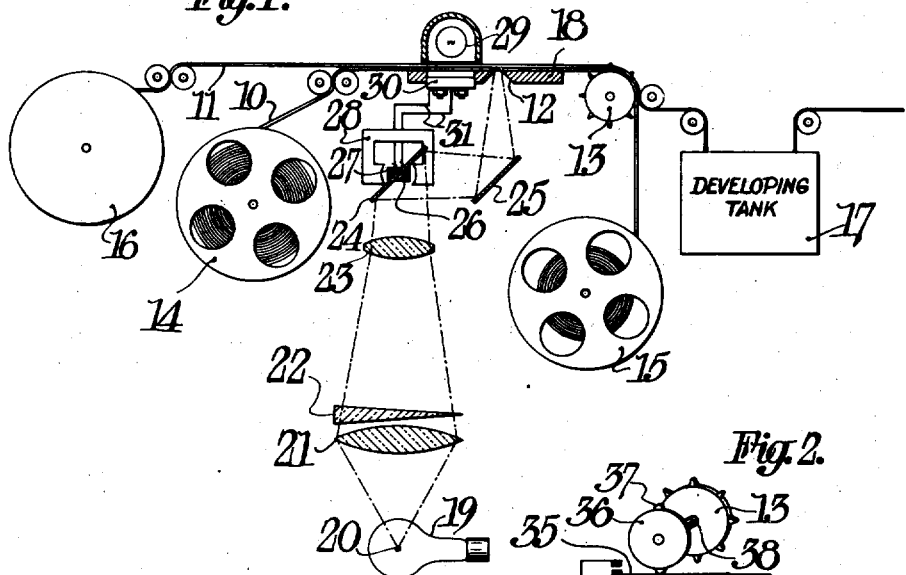
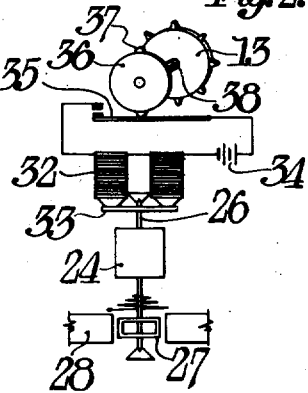
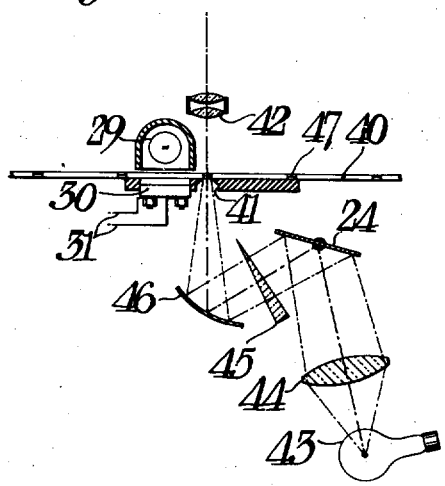
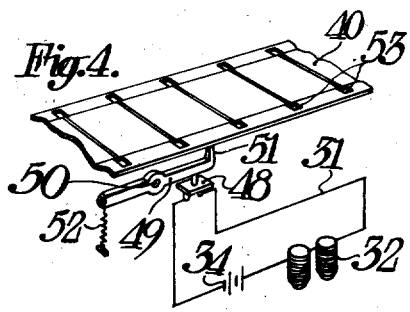
Inventor:
Clifton M. Tuttle, Patented Nov. 5, 1935

2,019,748

UNITED STATES PATENT OFFICE 2,019,748

PHOTOGRAPHIC PRINTING APPARATUS

Clifton M. Tuttle, Rochester, N. Y., assignor to Eastman Kodak Company, Rochester, N. Y., a corporation of New York Application September 18, 1934, Serial No. 744,473

4 Claims. (Cl. 95—75)

My invention relates to photographic printing apparatus and more particularly to such apparatus in which the exposure given the film being printed is controlled in accordance with the average transmission of the photographic record being printed by means of a suitable light sensitive cell.

My invention is particularly adapted for the printing of motion picture film either by contact or projection where the films are moved continuously past the exposure window.

In printers of this type in which a light sensitive cell is employed to control the printing exposure satisfactory results have been obtained by continuously balancing the exposure in accordance with the average transmission of the photographic record passing the measuring point. Although these results are in general satisfactory probably due to the fact that the average motion picture record contains relatively long lengths of substantially uniform density, they are not so accurate as in the step by step printer in which each individual frame is measured separately and given an exposure in accordance with this measurement. However, commercial processors of motion picture film are willing to accept these results in order to gain the speed of printing made possible by the continuous movement of the film during printing.

It is an object of my invention to provide a motion picture printer which makes possible the continuous printing of motion picture film while retaining the accuracy obtainable by individually governing the exposure of each frame of the film. Another object of the invention is the provision of an exposure control mechanism of low inertia and of very small lag whereby the exposure to be given an approaching frame is set up during the interval that a frame line is passing the exposure window.

According to the invention a continuous printer of either the contact or projection type is provided with an automatic exposure control arrangement which adjusts the intensity of the printing light individually for each frame passing over the exposure slit. A light sensitive cell may be used to measure the average transmission of a frame approaching the printing slit and during the time a frame line is passing over the slit mechanism under the control of the film perforations or the film driving apparatus acts to set up the proper intensity for printing the frame which has been measured.

The invention will be fully understood from the following description when read in connection with the accompanying drawing and its scope will be pointed out in the claims.

Fig. 1 shows diagrammatically one general arrangement for printing by contact;

Fig. 2 shows in diagrammatic form one arrangement for holding and releasing the light varying galvanometer coil in timed relation with the film being printed;

Fig. 3 shows diagrammatically a modified form of the invention suitable for projection printing or for giving the second exposure in a reversal process; and Fig. 4 shows a modified arrangement where the film perforations are utilized to govern the circuit controlling the galvanometer.

In the arrangement shown in Fig. 1 the negative 10 to be printed and the sensitive film 11 are moved in contact and in unison past an exposure window 12 by sprocket 13 which may be driven in any suitable well known manner. The negative film 10 may be unwound from a suitable reel 14 and rewound upon a reel 15 and the sensitive film 11 may be unwound from a reel 16 and after exposure at the window 12 may be guided into a suitable developing tank 17 as is well known. The exposure window 12 preferably comprises a relatively narrow slit formed in a suitable masking member 18 over which the two films are drawn in printing relation. The exposing light is furnished by any suitable source such as a lamp 19 which is preferably provided with a linear filament 20 which is optically parallel to the exposure slit 12. Light from the filament 20 is condensed by a suitable lens 21 onto an optical wedge 22, an image of which is formed at the exposure slit 12 and in the plane of the photographic record 10 by means of a suitable lens 23. The light passing through the lens 23 is directed onto the exposure slit 12 by suitably arranged mirrors 24 and 25. The mirror 25 is preferably stationary and the mirror 24 is mounted on a member 26 which is movable with an electric coil 27 of a galvanometer or other electric indicating instrument which may be provided with a magnet 28.

For any given position of the mirror 24 only a portion of the image of the wedge 22 passes through the exposure slit 12, the rest of the image being intercepted by the masking member 18. Thus it will be seen that adjustment of the angular relation between the mirrors 24 and 25 will cause a corresponding adjustment in the intensity of the light passing through the exposure slit 12 due to the fact that a different part of the image of the density wedge 22 will coincide with the slit 12. This adjustment is employed for controlling the printing exposure in the following manner: A measuring station which may consist of a suitable lamp 29 and a light sensitive cell 30 positioned on opposite sides of the two films 10 and 11 and immediately adjacent to the printing slit 12 so as to measure the transmission of the negative film 10 as it approaches the exposure slit 12. The area of the negative film measured preferably corresponds to a single frame of the film and, of course, the light used for measuring purposes is of a wave length to which the sensitive film 11 is insensitive as is well known practice. The cell 30 is connected to the coil 27 of the galvanometer by leads 31 so that the mirror 24 tends to assume a position corresponding to the activation of the cell 30 which in turn is a function of the average transmission of the photographic record 10 at any instant.

In accordance with the invention adjustment of the mirror 24 is permitted only during the time a frame line, which is preferably black, is passing over the exposure slit 12 after which the mirror 24 is clamped in position so that as the frame passes over the slit 12 its illumination is not varied. Any suitable arrangement may be used for controlling the clamping and unclamping of the mirror 24 and one suitable arrangement is shown in Fig. 2 as comprising an electro-magnet 32 positioned to attract and hold stationary a disc 33 of suitable magnetic material secured to the shaft 26 of the meter element.

The electro-magnet 32 is normally energized by a battery 34 through a circuit including a switch 35. The switch 35 may be opened against its inherent spring action at predetermined intervals corresponding to the passage of the frame line over the exposure slit 12 by means of a disc 36 provided with projecting lugs 37 and connected to be rotated synchronously with the film advancing sprocket 13 by means of a shaft 38.

The operation of the apparatus above described is as follows: While a frame line of the negative film 10 is passing over the exposure slit 12 one of the lugs 37 holds the switch 35 in opened position and permits the meter coil 27 to rotate the mirror 24 to a position corresponding to the average transmission of the frame approaching the exposure slit 12. After the frame line passes the slit 12 the lug 37 will have rotated a sufficient distance to permit the switch 35 to close, thereby causing the electro-magnet 32 to clamp the mirror 24 in its adjusted position where it will remain until another frame line passes over the exposure slit 12 at which time it is unclamped and again adjusted in accordance with the next frame which is now approaching the exposure slit.

In Fig. 3 is shown a modified arrangement of the lighting system as applied to a projection printer in which the photographic record 40 to be duplicated is continuously advanced past an exposure slit 41 in any well known manner and a projection lens 42 images the illuminated portion of the record onto a suitable sensitive film (not shown). Light from a lamp 43 is condensed by a suitable lens 44 and reflected by the galvanometer mirror 24 through a stationary optical wedge 45 onto a concave cylindrical reflector 46 which directs the light to the exposure slit 41.

The light on the slit 41 remains stationary whatever the position of the mirror 24 is but is varied in intensity in accordance with the portion of the wedge 45 through which the beam has been transmitted. The measuring system including the lamp 29 and the light sensitive cell 30 is the same as that described in connection with Fig. 1 except that the wave lengths of the measuring light may be any desired value since it does not pass through a sensitive layer as was the case in contact printing. As was the case in the apparatus shown in Fig. 1 adjustment of the mirror 24 for varying the intensity of the light falling on the exposure slit 41 takes place only during the time a frame line 47 is passing over the slit 41. Any suitable means either mechanical or electrical may be employed for releasing the galvanometer during an adjustment period in synchronism with the movement of the photographic record 40 and an additional arrangement is shown in Fig. 4 which is quite suitable when the photographic record is provided with but a single perforation per frame as is usual in 16 mm. film. In this arrangement the circuit through the electromagnet 32 is completed and opened by means of a switch contact 48 carried by an arm 49 which is pivoted at 50 and provided with a claw 51 which is resiliently pressed against the film 40 by means of a spring 52. When the end of the claw 51 is riding on the surface of the film 40 the contact 48 completes the circuit through the electro-magnet 32 and the battery 34 but when the claw 51 falls into one of the film perforations 53 the contact 48 is moved to open circuit position and during the interval the claw remains in the perforation 53 the meter coil 27 is free to adjust the mirror 24 in accordance with the activation of the light sensitive cell 30.

The modification illustrated in Figs. 3 and 4 lends itself very readily to the control of the secondary exposure in a reversal process in which event the photographic record which comprises a light sensitive bleached image as is well known and the measuring light furnished by the lamp 29 would have to be non-actinic relative to this sensitive layer.

The illuminating systems which have been described provide very convenient arrangements for varying the intensity of light falling on the printing slit or gate and, of course, are not limited to employment in conjunction with the clamping and unclamping of the meter element, but may be used without such means in which event the meter element is at all times responsive to the activation of the cell by the measuring light passing through the record.

From the above description it will be seen that my invention provides an automatic printing apparatus in which each frame is separately measured and the intensity of the exposing light is adjusted to correspond to this measurement after which the printing light is held constant for each frame.

It will be understood that the drawing is highly conventionalized and that only those parts of the apparatus necessary to complete understanding thereof have been disclosed.

While I have illustrated and described only two embodiments of my invention many modifications thereof will be apparent to anyone skilled in this art and I intend to cover all such modifications in the appended claims.

What I claim as new and desire to secure by Letters Patent of the United States is:

1. Means for controlling the printing of a photographic record on a sensitive layer, comprising means for continuously advancing the record and the layer through a printing position, an optical wedge, a source of light for illuminating said wedge and a lens for forming an image of said wedge at the printing position, means for occluding all but a limited portion of said image from said record, and adjustable means for shifting said image relatively to said occluding means, whereby the intensity of the light falling on said record at the printing position is a function of the adjustment of said shifting means.

2. Apparatus for printing film carrying along its length a plurality of image frames separated by frame lines including a printing window having a width approaching the width of a frame line, means for advancing the film continuously past said window, means for illuminating said window, movable means for varying the intensity of said window illumination, means controlled in accordance with the transmission of the frame approaching said window for actuating said movable means, and means operated in timed relation with the movement of the film past said window permitting actuation of said movable means only during the passage of a frame over said window.

3. In a motion picture film printing apparatus, a film testing station, a printing station adjacent thereto, means for continuously advancing a film past said stations whereby when a picture frame is passing the testing station its leading frame line is passing the printing station, movable means for adjusting the printing intensity, means for actuating said movable means in accordance with the density of the film at the testing station and means for rendering ineffective said actuating means at all times other than when a frame line is passing the printing station.

4. Photographic apparatus of the variable intensity constant time type comprising a source of light for illuminating a printing window, means for uniformly advancing a photographic record and a sensitized layer in printing relation past said window, movable means for varying the intensity of the light falling on said window, means for adjusting said movable means in accordance with the average density of a picture frame on said record when its leading frame line is passing said window and means for holding said mirror in adjusted position while the picture frame is passing said window.

CLIFTON M. TUTTLE.